Sept. 5, 1950        H. G. M. CARTOUX        2,521,342

EXPANSION SEALING JOINT FOR ROTARY FURNACES

Filed June 7, 1948

Inventor
H. G. M. Cartoux
By
C. F. Wenderoth,
Attorney

Patented Sept. 5, 1950

2,521,342

UNITED STATES PATENT OFFICE 2,521,342

EXPANSION SEALING JOINT FOR ROTARY FURNACES

Henri Gaspard Marie Cartoux, Chedde, France, assignor to Compagnie de Produits Chimiques et Electrometallurgiques Alais, Froges et Camargue, Paris, France Application June 7, 1948, Serial No. 31,517
In France June 12, 1947

7 Claims. (Cl. 285—96.1)

In rotary furnaces it is difficult to construct a simple device providing for a tight seal between the relatively movable and the fixed portion of the furnace, while at the same time freely permitting relative expansion therebetween.

An object of my present invention is to provide a solution for this problem.

My invention is based on the fact the material generally known as sponge rubber or cellular rubber is adapted, owing to its cellular structure, to be subjected to a considerable reduction in volume, in contradistinction with ordinary rubber which is adapted to be crushed or to breakdown under compression stress without any substantial alteration in its initial volume.

The joint or sealing device according to my invention comprises a ring of cellular rubber or the like housed within a groove formed in the fixed portion of the furnace and provided with cooling means therefore, an annular member being arranged to bear upon said ring, said annular member being also cooled and being in frictional engagement with an annular rib or projecting flange of the movable furnace structure.

The engagement between said rib and the external face of the cooled annular member provides for gas-tightness of the furnace while the cellular rubber enables relative expansion to be freely effected between the movable and the fixed structures of the furnace.

The accompanying drawing illustrates merely by way of indication and not of limitation one form of embodiment of the joint or sealing means according to my invention.

Figure 2:
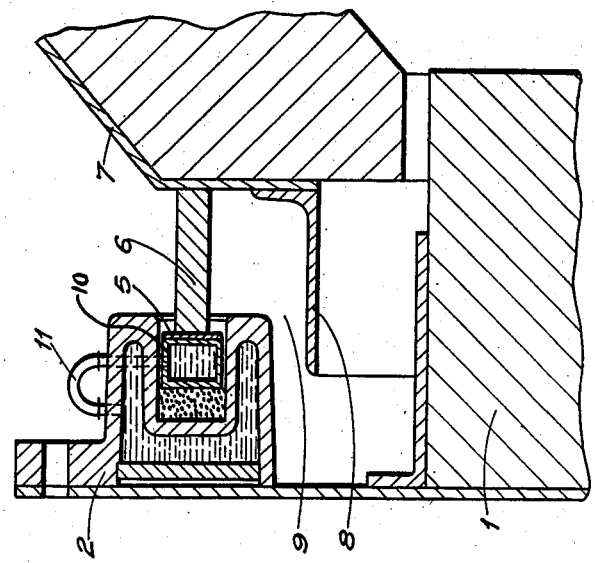
Fig. 2 is a fragmentary view of said device in greater detail.
Figure 3:
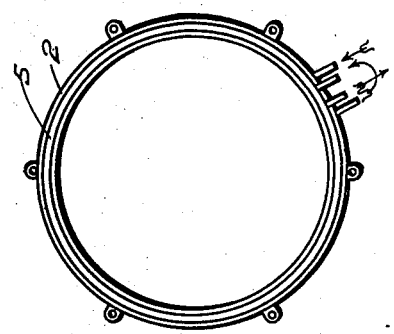
Fig. 3 is an end view of the joint.
Figure 1:
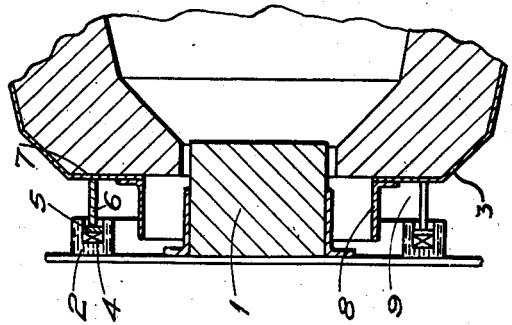
Fig. 1 is a diagrammatical axial cross-section through the assembly of my improved sealing device.

The fixed portion or frame structure 1 of the furnace carries the cooled annular member 2 formed in the side thereof directed towards the movable furnace structure 3 with an annular groove in which is contained a ring of sponge rubber or similar cellular rubber like material 4. Against said ring 4 there is supported a cooled annular element 5 made of a material having high abrasion-resisting characteristics, such as manganese steel for example. Said annular member engages the end face of cylindrical flange or projection 6 which is carried by a radial flange 7 rigid with the movable furnace structure. Said radial flange also supports a cylindrical wall 8 extending a certain distance into the sealing chamber 9 defined by the cylindrical flange 6.

In Fig. 2 there is shown the means used to cool the annular member 2 and the annular element 5. For this purpose there is interposed between the element 5 and the sponge rubber ring 4 a hollow metallic annular member 10 through which water is caused to circulate. The annular member 2 is also provided with a box shaped or jacket cross-section and water is also caused to flow therethrough. The cellular rubber-like material is thus cooled over all the side faces thereof. In practice the cooling water flows into the annular member 10, then flows into the annular member 2 through a conduit 11 which is so formed as to conform to the displacements of the annular element 5.

In general, the flange 6 or the whole assembly including the flanges 6 and 7 is provided removable so as to facilitate the replacement of a cellular rubber ring member 4. Alternatively, the ring itself may be provided removable.

The sealing device according to the invention is applicable to all types of rotary or oscillating furnaces regardless of the heating means employed therein and of the particular application for which they may be intended. Thus the invention may be applied to calcining furnaces, melting furnaces, mixing furnaces, electric furnaces provided with direct arcs or resistors, and so on. It is found that prior to the mounting of the sealing means the atmosphere within the furnace is always oxidizing owing to the ingress of air through the flame-guards of the furnace or through the apertures opposite to the electrodes or the burners, and so on. On the other hand with the use of the sealing device according to the invention the atmosphere in the furnace is reducing or neutral. It may then be rendered oxidizing by increasing the clearance space provided at the flame guards, at the burner air inlets and the like.

Thus in view of the above, the cellular or sponge rubber ring joint or gasket sealing device secures the following advantages:

It provides for a full seal or gas-tightness while at the same time allowing free relative expansion between the elements of the furnace structure. In the case of electric furnaces it thereby reduces in a ratio as high as 2 and even 3 times, the normal consumption of electrodes while maintaining the desired atmosphere in the furnace.

The improved expansion seal joint according to the invention has been used in continuous operation with an internal temperature in the rotary furnace of 1700–1750° C. no trouble whatever was experienced during the run. Upon inspection of the parts, no defect was found and the joint was put back into place as it was. In particular, no wear was observed in the sponge rubber and no vulcanizing effect was found on it.

In the case of furnaces of great length, in order to provide for free expansion in the elements, a plurality of joints of the type described above, that is each comprising a water chamber, a sponge rubber member and the cooling annular member for the rubber frictionally engaged by the movable furnace structure, are mounted in series.

It will of course be understood that the invention is not restricted to the exemplary embodiment thereof illustrated and described and that a number of modifications may be made within the scope of the ensuing claims.

It is to be understood that in the foregoing specification and throughout the ensuing claims, the expression "cellular rubber" and the like is to be construed as including any natural or synthetic rubber-like elastic material structurally formed with a multiplicity of small apertures therein in which is entrapped a suitable gas, one example of such material being provided by the material commercially available under the name of "sponge rubber."

What I claim is:

1. In a furnace including a fixed frame and a movable structure rotatable with respect thereto, expansion sealing means for said furnace comprising in combination an annular groove in said frame coaxial with the axis of rotation of said structure, a ring of cellular rubberlike material contained in said groove, an annular friction element arranged against the outer face of said ring and a cylindrical projection of said rotatable structure extending into said groove in rotary sealing engagement with said friction element.

2. In a furnace including a fixed structure and a movable structure rotatable with respect thereto, expansion sealing means comprising in combination an annular groove in said fixed structure coaxial with the axis of rotation of said rotatable structure, a ring of cellular rubberlike material in said groove, a wear-taking element in said groove engaging the outer surface of said ring, means for withdrawing heat substantially from all sides of the cross-section of said ring and a projection of said rotatable structure in rotary sealing engagement with said wear-taking element.

3. In a rotary furnace having a fixed and a rotatable structure, an expansion joint comprising in combination, an annular member rigid with said fixed structure arranged coaxially with said rotatable structure, an annular groove formed in said member and directed towards said movable structure, means in said member for circulating cooling water in cooling relationship with the sides and the bottom of said groove, a cellular rubberlike ring contained in said groove, a wear-taking annular element in said groove engaging the outer face of said ring, and a projection of said rotatable structure engaging said element in rotary sealing relationship therewith.

4. In a furnace having a relatively fixed and a rotatable structure, expansion sealing means comprising in combination a hollow annular member rigid with said fixed structure having a recess therein and coaxial with said rotatable structure, a groove formed in said member directed towards said rotatable structure, a ring of cellular rubberlike material in said groove, means to circulate a cooling fluid through said recess in said member in cooling relationship with the inner and side faces of said ring, means in said groove for circulating cooling fluid in cooling relationship with the outer face of said ring, an annular wear-taking element in said groove frictionally engaging the outer surface of said last mentioned cooling means and a projection of said rotatable structure rotatably frictionally engaging the outer surface of said wear taking element.

5. In a furnace having a relatively fixed and a rotatable structure, expansion sealing means comprising in combination a double-walled annular member of channel like cross-section rigid with said fixed structure coaxial with said rotatable structure, the opening of said channel section forming a groove directed towards said rotatable structure, a ring of cellular rubber-like material contained in said groove, an annular member of recessed cross section in said groove engaging the outer face of said ring, an annular wear-taking element engaging the outer surface of said last mentioned annular member, an annular projection of said rotatable structure engaging said wear-taking element in rotatable sealing relationship therewith, a swan-neck type of conduit interconnecting the recesses in both said annular members, means for introducing a cooling fluid into one of said members and for withdrawing said cooling fluid from the other one of said members.

6. In a rotary furnace having a relatively fixed and a rotatable structure expansion sealing means comprising in combination an annular member rigid with said fixed structure having a groove therein coaxial with and directed towards said rotatable structure, a ring of cellular rubber-like material in said groove, a radial flange rigid with said rotatable structure, a cylindrical flange projecting from said radial flange into said groove in rotary sealing engagement with said ring through the interposal of wear-taking means, said cylindrical flange defining the radially outer wall of an annular sealing chamber for said furnace, a cylindrical flange radially inwardly of said first mentioned cylindrical wall extending into said chamber, and means for circulating a cooling fluid in heat exchanging relation around the faces of said ring.

7. A rotary furnace of substantial length comprising a plurality of sections freely expansible with respect to each other, and expansion joints between adjacent sections of said furnace each joint comprising a fluid-cooled annular member rigid with one of said sections at one end thereof, formed with a groove directed towards a next adjacent section, a ring of cellular rubberlike material in said groove, an annular recessed member in said groove engaging the outer face of said ring, means to circulate a cooling fluid through both said members, and an annular projection of said second mentioned furnace section extending into said groove in sealing relationship with the outer surface of said last mentioned member.

HENRI GASPARD MARIE CARTOUX.

REFERENCES CITED

The following references are of record in the file of this patent:

UNITED STATES PATENTS

| Number | Name | Date |
|---|---|---|
| 1,503,054 | Kuntz | July 29, 1924 |
| 2,373,443 | Armington | Apr. 10, 1945 |

FOREIGN PATENTS

| Number | Country | Date |
|---|---|---|
| 669,727 | Germany | Nov. 27, 1936 |